United States Patent Office 2,935,534
Patented May 3, 1960

2,935,534
ETHER DIMERIZATION
Raymond I. Hoaglin and Donald H. Hirsh, South Charleston, W. Va., assignors to Union Carbide Corporation, a corporation of New York No Drawing. Application March 29, 1957
Serial No. 649,323

10 Claims. (Cl. 260—615)

The present invention relates to ethylenic diethers as new compositions of matter and to a method of preparing the same. More particularly it is concerned with the preparation of novel distillable diethers of ethylenically unsaturated compounds in which one of the ether oxygen atoms is attached to one of the ethylenic carbon atoms and the second ether oxygen atom is attached to an aliphatic carbon positioned next to the second ethylenic carbon atom. Stated in other words our ethylenic diethers are characterized by a structure that can be represented graphically as follows:

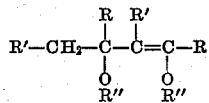

wherein R is either a methyl or ethyl radical; R' is hydrogen or a methyl or ethyl radical, and R" is a monovalent hydrocarbon radical, that is alkyl, aryl, alkylaryl or arylalkyl. Illustratively, and indeed preferably, R" can be an alkyl radical containing 1 to 8 carbon atoms. The preferred compounds prepared in accordance with the practice of the present invention are 2,4-dialkoxy-4-methyl-2-pentenes.

The method of preparing these compounds comprises forming a mixture of boron trifluoride, a non-polar organic diluent and at least two mols of an ethylenically unsaturated ether of the following general formula:

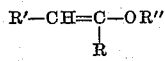

wherein each of R, R' and R" is as described above, to cause the dimerization thereof.

Illustrative of these ether starting materials are methyl isopropenyl ether, ethyl isopropenyl ether, n-propyl isopropenyl ether, isopropyl isopropenyl ether, n-butyl isopropenyl ether, alpha, beta-dimethylvinyl methyl ether, isobutyl isopropenyl ether, pentyl isopropenyl ether, alpha, beta-diethyl vinyl methyl ether, hexyl isopropenyl ether, 2-ethylbutyl isopropenyl ether, alpha-methyl-beta-ethyl vinyl methyl ether, 2-ethylhexyl isopropenyl ether, octyl isopropenyl ether, isopropenyl phenyl ether, isopropenyl 2-phenyl ethyl ether, alpha-ethylvinyl ether and alpha, beta-dimethylvinyl ethyl ether. The preferred class of reactants are the isopropenyl ethers.

There is shown in the following table illustrative examples of reactant monomers and the dimers prepared therefrom in accordance with the practice of the present invention.

TABLE I

| Monomer | Dimer |
|---|---|
| propyl isopropenyl ether | 2,4-dipropoxy-4-methyl-2-pentene. |
| isopropyl isopropenyl ether | 2,4-di(isopropoxy)-4-methyl-2-pentene. |
| isobutyl isopropenyl ether | 2,4-di(2-methylpropoxy)-4-methyl-2-pentene. |
| 2-ethyl butyl isopropenyl ether | 2,4-di(2-ethylbutoxy)-4-methyl-2-pentene. |
| 2-ethyl hexyl isopropenyl ether | 2,4-di(2-ethylhexoxy)-4-methyl-2-pentene. |

The method of forming the reaction mix is not critical, however the reaction is most efficiently carried out when the monomer is slowly introduced into a reaction vessel to which the boron trifluoride catalyst has been added previously. The reaction is carried out preferably under essentially anhydrous conditions to prevent hydrolysis of the unsaturated ether.

The operative limits of catalyst is in the range of 0.001 percent to 1.0 percent of catalyst in the reaction mix by weight of the total charge of solvent and reactant introduced therein. The preferred catalyst concentration is 0.01 percent to 0.10 percent by weight of the total charge.

The concentration of monomer in the reaction mix is not narrowly critical. Thus, for example, a weight ratio of at least 1 part of monomer to 15 parts of solvent is thoroughly operative, while the upper limit is delineated solely by economic considerations. A ratio by weight of approximately 1 part of solvent to 5 parts of monomer to 5 parts of monomer and 1 part of solvent is, however, a preferred range.

The preferred temperature range for the practice of the present invention is from 30° C. to 50° C., while temperatures of from 0° C. or less to 150° C. or higher are wholly operative.

Pressure is in no wise critical and the reaction will proceed at atmospheric pressure, as well as under subatmospheric and superatmospheric pressures.

The term "non-polar organic diluent" as employed throughout this specification embraces dialkyl ethers, polyethers and anhydrous non-polar saturated hydrocarbons such as for example, diethyl ether, diisopropyl ether, di-n-propyl ether, dibutyl ether, dihexyl ether, ethyl butyl ether, propyl hexyl ether, dioxane, dimethoxy ethane, diethyl ether of diethylene glycol, heptane, octane and tetrahydronaphthalene.

The diethers of the present invention are particularly useful intermediates in the formation of solvents, plasticizers and oil additives by standard procedures. Illustratively, these diethers can be converted by acid hydrolysis employing sulfuric acid and water, to the corresponding 2-keto-4-alkoxy derivatives which are then hydrogenated using, for example, Raney nickel catalyst at moderate pressures of 50 to 100 pounds per square inch, to form the corresponding 2-hydroxy-4-alkoxy derivative, which in turn, can be directly esterified with hydrochloric acid as catalyst, with a suitable alpha, beta unsaturated acid such as, for example, acrylic acid. The product so obtained is then polymerized at atmospheric pressure employing tertiary butyl peroxide as the catalyst to form desirable oil additives functioning as pour point depressants and viscosity index improvers.

The 2-hydroxy-4-alkoxy derivatives of the diethers of our invention, referred to and described hereinabove, can also be converted by reaction with phosphorous trichloride, to form the corresponding phosphate derivatives with the elimination of hydrochloric acid. The reaction can be catalyzed optionally by the introduction of magnesium chloride into the reaction mix. The product phosphates are useful as plasticizers for vinyl resins, i.e. polyvinyl chloride and as corrosion inhibiting oil additives.

The following examples are further illustrative of the invention.

*Example 1*

Diethyl ether (1825 grams) and 1.11 grams boron trifluoride in 3.87 grams of diethyl ether solution were charged together to a 5-liter, creased kettle equipped with a motor-driven stirrer, a brine-cooled reflux condenser, a thermometer, and a separatory funnel. To facilitate temperature control, the reaction kettle was placed in a 10-quart bucket wherein either hot or cold water could be added.

After heating the mixture of diethyl ether and boron trifluoride to reflux temperature, about 35° C., isopropenyl ethyl ether (822 grams of 97.7 percent by weight purity) was slowly added from a separatory funnel to the agitated mixture at from 35 to 40° C. The heat of reaction was removed by the refluxing diethyl ether.

Twenty minutes after the isopropenyl ethyl ether had been added, the boron trifluoride catalyst was neutralized by adding 5.7 grams of potassium hydroxide in 20.3 grams of ethanol. After filtration, the product was distilled and 183 grams of a fraction boiling at 77° C. under 20 mm. of mercury (51.5° C. at 5 mm. Hg) was isolated. This represents a yield of the dimer of about 21 percent. The physical properties of the isolated fraction were determined: specific gravity at 20/20° C., 0.860; refractive index $n$ 20/D, 1.4272; molecular refractivity (observed), 51.5; molecular refractivity (calculated), 51.2. The purity, as the dimer of isopropenyl ethyl ether, was 98.4 percent. The carbon and hydrogen content by analysis was 69.6 and 11.8 percent respectively, as compared with calculated values of 69.7 and 11.7 percent. Examination with the infra-red spectrometer showed the structure of the dimer to be that of 2,4-diethoxy-4-methyl-2-pentene. The product dimer was further characterized by the following procedures:

The product obtained by a standard mild hydrolysis procedure was identified as 4-ethoxy-4-methyl-2-pentanone by comparison of the melting point of the semicarbazone, prepared by conventional methods from the hydrolyzed dimer, with the melting point of the semicarbazone of 4-ethoxy-4-methyl-2-pentanone reported by Hoffman (Journal of the American Chemical Society vol. 49, pages 530 to 535; 1927). The melting point of the dimer derivative was 163° C.; the melting point of Hoffman's semicarbazone was 163–164° C.

Because the melting point of the semicarbazone of the hydrolysis product was substantially the same as the melting point of the semicarbazone of mesityl oxide (163° and 164° C., respectively), the melting point of a mixture of the two semicarbazones was determined to establish whether these derivatives were of different molecular structure. The mixture had a considerably lower melting point, 135° C., which indicated that the compounds were not the same.

Physical properties of the hydrolysis product (4-ethoxy-4-methyl-2-pentanone), as determined by the inventors were: boiling point at 20 mm. Hg, 67.5° C.; specific gravity at 25.5/20° C., 0.882; and refractive index $n$ 21/D, 1.4168. The physical properties of 4-ethoxy-4-methyl-2-pentanone reported by Hoffman were: boiling point, 164 to 166° C. (760 mm.), which when extrapolated to 20 mm., gives a boiling point of 67.5° C., identical with that observed by the inventors; specific gravity at 25/25° C., 0.886.

The product obtained by conventional hydrolysis and dealcoholation techniques (by steam distillation) of the hydrolyzed dimer, was identified as mesityl oxide (4-methyl-3-penten-2-one) by comparing the melting point of the 2,4-dinitrophenylhydrazone derivative of the organic layer of the steam distillate with the melting point of the 2,4-dinitrophenylhydrazone of mesityl oxide. The melting point of the derivative was about 202° C. to 203° C. This agreed with the melting point of the 2,4-dinitrophenylhydrazone of mesityl oxide which was 201° C. The melting point of a mixture of the two 2,4-dinitrophenylhydrazones was not depressed (201° C.).

Identification of the derivative of the steam distillate, as the 2,4-dinitrophenylhydrazone of mesityl oxide, was further substantiated by examination with the infra-red spectrometer.

Example 2

In a manner similar to that used in Example 1, 1037 grams of isopropenyl methyl ether having a purity of 97.4 percent by weight was added to 1040 grams of refluxing diethyl ether to which had been added 1.04 grams (0.05 percent of total charge of solvent and reactant monomer) of boron trifluoride catalyst. A constant-boiling fraction of 160 grams of the dimer, 2,4-dimethoxy-4-methyl-2-pentene, having a purity of 98.6 percent by weight, was recovered by distillation. This represents a yield of 15.5 percent. The following properties were determined: boiling point, 57° C. (20 mm. Hg); specific gravity, 0.889 (20/20° C.); refractive index $n$ 20/D, 1.4300; molecular refractivity (observed) MR, 41.9 and molecular refractivity (calculated) MR, 41.96. Elemental analysis for C and H was as follows: observed, C=67.0, H=11.3; calculated, C=66.6, H=11.2.

Example 3

In accordance with the procedure described in Example 1, 568 grams of isopropenyl butyl ether having a purity of 98.6 percent by weight was added to 500 grams of refluxing diethyl ether to which in turn was added 0.52 gram of boron trifluoride (0.05 percent by weight of the total charge of solvent and reactant monomer) in 1.15 grams of diethyl ether. The boron trifluoride catalyst was neutralized by adding 2.6 grams of potassium hydroxide in a solution of 9.4 grams of ethanol thereto. A constant-boiling fraction of 44 grams of the dimer, a yield of 7.6 percent by weight of the total monomer employed, and having a purity of 96.6 percent was recovered by distillation. This material had a specific gravity of 0.856 (20/20° C.) and a refractive index of 1.4377. The observed and calculated molecular refractivities, MR, were 70.1 and 69.67 respectively.

Example 4

In accordance with the procedure described in Example 1, 529 grams of isopropenyl ethyl ether was added to 37 grams of refluxing diethyl ether to which in turn was added 0.25 gram of boron trifluoride (0.05 percent by weight of the total charge of solvent and reactant monomer) in 0.69 gram of diethyl ether. A constant boiling fraction of the dimer of isopropenyl ethyl ether was obtained.

Example 5

In accordance with the procedure described in Example 1, 264 grams of isopropenyl ethyl ether was added to 175 grams of refluxing diethyl ether to which in turn was added 0.22 gram of boron trifluoride (0.05 percent by weight of the total charge of solvent and reactant monomer). A constant boiling fraction of the dimer of isopropenyl ethyl ether was obtained.

Example 6

In accordance with the procedure described in Example 1, 264 grams of isopropenyl ethyl ether was added to 175 grams of refluxing diethyl ether to which in turn was added 0.22 gram of boron trifluoride (0.05 percent by weight of the total charge of solvent and reactant monomer) in 0.59 gram of diethyl ether. A constant boiling fraction of 48 grams of the dimer of isopropenyl ethyl ether, a yield of 18 percent by weight of the total monomer employed in the reaction mix, was obtained.

Example 7

In accordance with the procedure described in Example 1, 1106 grams of isopropenyl ethyl ether was added to 1106 grams of dioxane to which in turn was added 1.11 grams of boron trifluoride (0.05 percent by weight of the total charge of solvent and reactant) monomer in 2.96 grams of diethyl ether. A constant boiling fraction of the dimer of isopropenyl ethyl ether was obtained.

Example 8

In accordance with the procedure described in Example 1, 1228 grams of isopropenyl butyl ether having a purity of 88.5 weight percent was added to 700 grams of diethyl ether to which in turn was added 0.95 gram of boron trifluoride (0.05 percent by weight of the total charge of solvent and reactant monomer) in 2.02 grams of diethyl ether. A constant boiling fraction of 55 grams of the dimer of isopropenyl butyl ether having a purity of 96.8 weight percent, a yield of 4.9 percent by weight of the total monomer charged to the reaction mix, was obtained.

What is claimed is:

1. A compound of the formula:

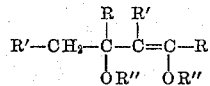

wherein R is a member selected from the group consisting of methyl and ethyl; R' is a member selected from the group consisting of hydrogen, methyl and ethyl; and R" is an alkyl radical containing 1 to 8 carbon atoms.

2. A compound of the formula:

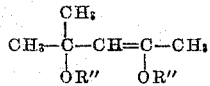

wherein R" is an alkyl radical containing 1 to 8 carbon atoms.

3. 2,4-diethoxy-4-methyl-2-pentene.
4. 2,4-dimethoxy-4-methyl-2-pentene.
5. 2,4-dibutoxy-4-methyl-2-pentene.
6. A process for preparing compounds of the formula:

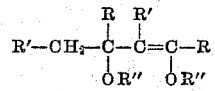

wherein R is a member selected from the group consisting of methyl and ethyl; R' is a member selected from the group consisting of hydrogen, methyl and ethyl; and R" is an alkyl radical containing 1 to 8 carbon atoms, which comprises forming a mixture of from about 0.001 to about 1.0 percent by weight of boron trifluoride, an organic diluent, and at least two moles of an ethylenically unsaturated ether of the formula:

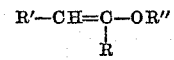

wherein R is a member selected from the group consisting of methyl and ethyl; R' is a member selected from the group consisting of hydrogen, methyl and ethyl; and R" is an alkyl radical containing 1 to 8 carbon atoms, at a temperature of from 0° C. to 150° C. to cause the dimerization thereof.

7. A process for preparing compounds of the formula:

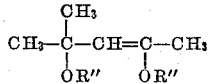

wherein R" is an alkyl radical containing 1 to 8 carbon atoms, which comprises forming a mixture of from about 0.001 to about 1.0 percent by weight of boron trifluoride, a non-polar organic diluent and at least two moles of an ethylenically unsaturated ether of the formula:

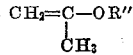

wherein R" is an alkyl radical containing 1 to 8 carbon atoms, at a temperature of from 0° C. to 150° C. to cause the dimerization thereof.

8. A process for preparing 2,4-diethoxy-4-methyl-2-pentene, which comprises dimerizing isopropenyl ethyl ether in the presence of from about 0.001 to about 1.0 percent by weight of boron trifluoride and an organic diluent at a temperature of from 0° C. to 150° C.

9. A process for preparing 2,4-dimethoxy-4-methyl-2-pentene, which comprises dimerizing isopropenyl methyl ether in the presence of from about 0.001 to about 1.0 percent by weight of boron trifluoride and an organic diluent at a temperature of from 0° to 150° C.

10. A process for preparing 2,4-dibutoxy-4-methyl-2-pentene, which comprises dimerizing isopropenyl butyl ether in the presence of from about 0.001 to about 1.0 percent by weight of boron trifluoride and an organic diluent at a temperature of from 0° C. to 150° C.

References Cited in the file of this patent

UNITED STATES PATENTS

| | | |
|---|---|---|
| 2,061,934 | Mueller-Cunradi et al. | Nov. 24, 1936 |
| 2,104,000 | Reppe et al. | Dec. 28, 1937 |
| 2,189,529 | Carothers et al. | Feb. 6, 1940 |
| 2,700,059 | Hall et al. | Jan. 18, 1955 |